May 14, 1929.  A. C. SUTHERLAND  1,712,483
FLEXIBLE HARROW
Filed Dec. 15, 1927
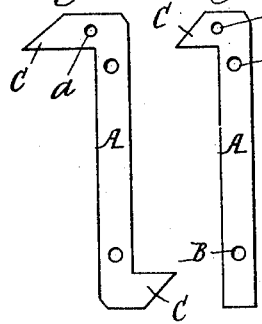
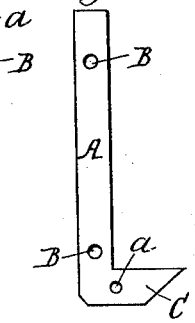
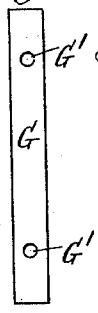
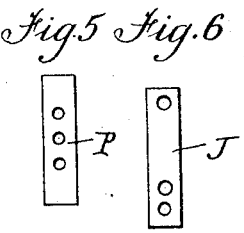
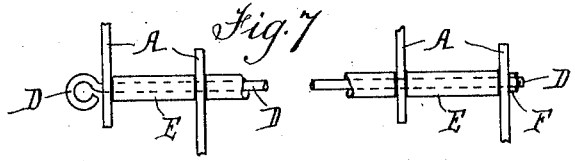
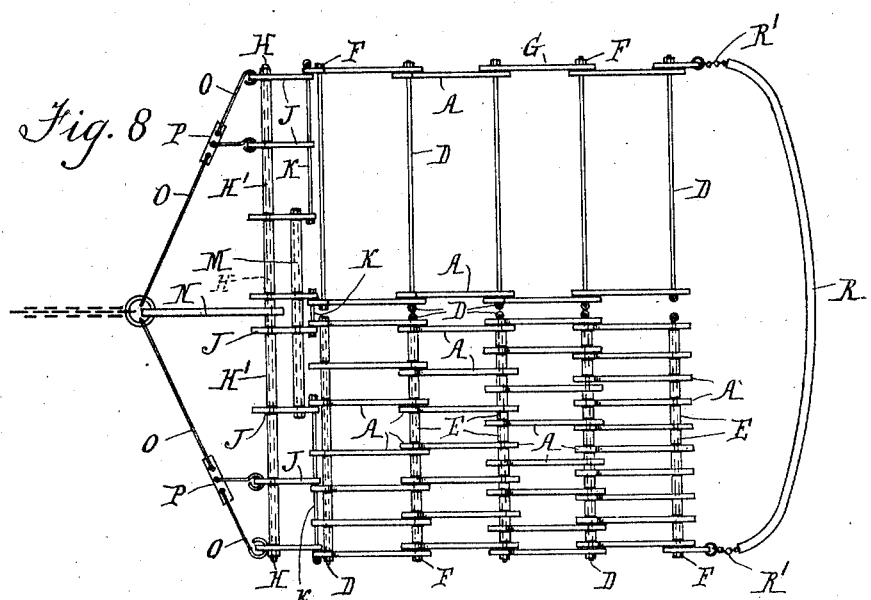
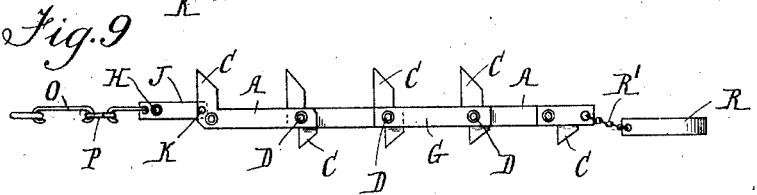
Inventor:
Alexander Campbell Sutherland
By
Attorney Patented May 14, 1929.

1,712,483

UNITED STATES PATENT OFFICE.

ALEXANDER CAMPBELL SUTHERLAND, OF WHAKATANE, NEW ZEALAND.

FLEXIBLE HARROW.

Application filed December 15, 1927, Serial No. 240,281, and in New Zealand August 12, 1927.

This invention relates to an improved construction of harrow of the flexible drag type and embodies special features concerned with the formation of the harrow tines and their assembly in the harrow framing to form the complete machine.

The features governing the construction of the harrow allow of the free flexibility of the machine in its travel over the ground's surface. They also allow of the harrow being worked on either side to provide for variable depths of working action, and for it being dragged either forwardly or rearwardly to effect different operations upon the earth.

The invention consists in a construction of harrow made up of a number of units, each composed of a series of standardized tines of special form, arranged in rows one behind the other in a framing, and connected together so that working tine faces are formed having the desired flexibility and range of action.

This construction, in addition, provides for the ready assembly of the different elements comprising its make up and for the quick removal and replacement of any worn or damaged part.

This construction is illustrated in the accompanying drawings, in which:—

Figures 1 to 3 are side elevations of three differently formed tine members of the harrow.

Figure 4 is a side elevation of a link used in the assembly of the harrow.

Figures 5 and 6 are side elevations of links used in the attachment of the draught means to the harrow.

Figure 7 is a detail view illustrating the method of assembling the harrow elements.

Figure 8 is a plan of a harrow made up of two units attached to the same draught means, the framing of one unit being shown in its skeleton form.

Figure 9 is a side elevation thereof.

In the construction of the harrow a number of standardized tines A (Figures 1 to 3) of special form are used. Each of these is made by a flat piece of mild steel, or other approved metal, that is bored with a hole B, near each end, and in the form shown in Figure 1, is made with a tine point C projecting at right angles from its edge at each end. These points extend in respectively opposite directions from the edges, and each is made with a point tapering from its inner edge to the outer edge. The points are also made of respectively different lengths.

In each of the forms shown in Figures 2 and 3 the tine is made with one point only, in one case the point length being the same as the shorter point of the double pointed tine, and in the other instance of the same length as the longer point of the double pointed tine.

A number of tines A thus formed are threaded upon metal rods D passing through the holes B near each end, so that the tine points C then extend vertically upward and downward. The tines are spaced the necessary distance apart by means of distance sleeves or collars E placed on the rods D between them, and the whole series are secured on these rods by means of lock nuts F screwed on the ends of the rods and pressing the tines and sleeves together between them. The tines however swivel on the rods.

A number of elements thus made are arranged one behind the other as in Figures 8 and 9 to form the harrow body, the tines being arranged in any desired relationship one row to another, and being varied in number in the different rows to suit any special requirements. Also the tines of each row at their rear ends are threaded upon the same rod as are the forward ends of the tines in the next row and thus the desired flexibility is obtained, the tines forming links extending from front to rear of the harrow.

The provision of tines with single points, as in Figures 2 and 3, allows for the relative number of points in any row being varied as compared with the two working faces of the harrow and also in the direction of the harrow's travel, so that any desired effect may be obtained by the assembly of the tine members in the required relationship.

When the tines of the form shown in Figure 1 are drawn in one direction, the tine points C engage the ground with their straight edges; and when drawn in the other direction, they engage the ground with their tapering edges, so that different effects are thereby produced. So also if the tines are arranged in the harrow so that the longer tine points extend from the same face of the implement, the reversal of the implement from one face to the other will result in operations at different depths. On each face therefore the two effects in operation previously referred to may be obtained.

A harrow unit made up of these rows of teeth may be combined with other units similarly made and arranged end to end therewith to provide for a machine of any required width.

The harrow thus made may be readily disassembled for transport purposes by merely removing the lock nuts from the rod ends, when the teeth and distance sleeves will be free to slide off. A replacement of a damaged tooth may also be readily effected in this way. Or the harrow units as a whole may be folded up on the swivel joints formed by their link connections from one rod to another and thus the unit brought into small compass.

In the assembly of the harrow members, the tines A may in certain instances be replaced by connecting links G (Figure 4) which serve to form connections from one rod D to another, each of such links being formed of a flat plate having holes G' bored near each end to thread upon the rods D.

The units forming the harrow are arranged to trail behind any suitable form of draught connecting means, to which they are attached by pivotal connections. These may vary in several ways to suit the special circumstances of each case. In the drawings, however, a suitable method of connecting up the draught means to two or more units, is shown which provides for a long rod H to extend across the front of all of the units. This is linked to certain of the tine members A by means of a number of links J (Figure 6) the forward ends of which have the rod H passing through them, while the rear ends are connected to the said tine members by means of bolts K passing through them and also through apertures a made in the ends of the tine members for that purpose. Only certain of the front and rear row of tines need have these apertures, but for standardizing purposes the apertures may be formed in all of such members. The links J are kept properly spaced along the rod H by means of distance sleeves H' passed thereon, the whole being held in position by means of lock nuts screwed on the rod ends.

The central portion of this connection may be braced by means of a bracing bolt M passing across and through certain of the links J on each side of the centre, so that the draught rod H is thereby strengthened against any possibility of buckling under the draught strain.

From the front of this rod H extends a draught attaching frame formed by a central bar N extending from the rod centre, and two lateral stays O extending from the respective ends of the rod to the forward end of the bar N. Each of these stays embodies a link P (Figure 5) interposed in its length to provide for the adjustment of the stay and which also may be connected to one of the link members J.

By removing the bolts K, which are made short for that purpose, the whole draught frame is freed so that it may be transferred bodily to the rear and connected up to the rear tine members in a similar manner.

The harrow has also combined with it a drag bar R (Figures 8 and 9) for the purpose of spreading and levelling the earth torn up by the tines and also to help in keeping the tines down to their work. This bar is preferably shaped as a bow curving rearwards between its ends so that the loose earth travelled over will be spread out by its operation. It is attached at each of its ends to the corresponding outside of the harrow by loose chains R'.

I claim:—

A flexible harrow comprising a plurality of similar units arranged side by side; each unit embodying a set of transverse rods disposed one behind another, a plurality of rows of tine members extending between and loosely threaded on said rods in substantial endwise alinement, so as to pivotally connect them together, each tine member consisting of a flat metal plate formed at its ends with a pair of points that extend in opposite directions, distance sleeves arranged on the rods between the tine members, and means for retaining said sleeves and tine members upon said rods; draught means extending across the front ends of the several units; link connections between said draught means and unit ends; and a bow-shaped drag bar linked to the outer rear corners of said units.

In testimony whereof, I affix my signature.

ALEXANDER CAMPBELL SUTHERLAND.